United States Patent [19]

Boyce et al.

[11] Patent Number: 5,059,273

[45] Date of Patent: Oct. 22, 1991

[54] PROCESS FOR PREPARING POLYIMIDE COMPOSITES

[75] Inventors: Richard J. Boyce, Elkton; Thomas P. Gannett, Wilmington, both of Md.

[73] Assignee: E. I. du Pont de Nemours and Company, Wilmington, Del.

[21] Appl. No.: 426,932

[22] Filed: Oct. 26, 1989

[51] Int. Cl.$^5$ .................................................. C09J 5/02
[52] U.S. Cl. .................................. 156/307.4; 156/286; 156/331.1; 427/375; 428/473.5; 528/348
[58] Field of Search ............... 156/307.4, 331.1, 286; 428/473.5; 528/348; 427/375

[56] References Cited

U.S. PATENT DOCUMENTS

| | | | |
|---|---|---|---|
| 3,745,149 | 7/1973 | Serafini | 260/65 |
| 4,336,175 | 6/1982 | Gibbs | 524/726 |
| 4,358,581 | 11/1982 | Sutton, Jr. | 528/353 |
| 4,485,140 | 11/1984 | Gannett et al. | 428/473.5 |
| 4,576,857 | 3/1986 | Gannett et al. | 428/260 |
| 4,600,617 | 7/1986 | Cole | 428/64 |
| 4,624,888 | 11/1986 | St. Clair et al. | 428/262 |
| 4,645,823 | 2/1987 | Ai et al. | 528/336 |
| 4,898,754 | 2/1990 | Christensen et al. | 428/473.5 |

FOREIGN PATENT DOCUMENTS 1396331 6/1975 United Kingdom .

*Primary Examiner*—John J. Gallagher

[57] ABSTRACT

Low void composites with high Tg polyimide matrices are prepared from stoichiometrically unbalanced precursors.

4 Claims, 1 Drawing Sheet

PROCESS FOR PREPARING POLYIMIDE COMPOSITES

BACKGROUND OF THE INVENTION

To be useful at high temperatures organic polymers must have a high softening point, e.g., a high glass transition temperature (Tg), and have sufficient thermal/oxidative stability (TOS) to retain adequate mechanical properties for a useful lifetime at expected service temperatures. Polyimide resins based on stoichiometrically balanced monomers of predominantly aromatic structure are known to fulfill such requirements. The high temperature performance of these polyimides has created considerable interest for their use in the aerospace industry. However, these polymers often require the use of extreme processing temperatures and pressures. Processing at extreme conditions is a deterrent to the manufacture of useful articles because of limited availability of such equipment.

Although the use of monomeric or low molecular weight prepolymer solutions facilitates impregnation of fiber structures, it still remains difficult to complete polymerization and devolatilization with this "wet" prepreg while achieving essentially complete consolidation, or compaction. This, in turn, has made it difficult to routinely produce high quality, low void, composite laminates with such resins, especially using the low to moderate pressure autoclaves which are typical of the aerospace industry composite manufacturing capability. The inherent processing difficulty of these resins arises from the high melt viscosity characteristic of the aromatic polyimide structure at chain molecular weights sufficient to yield high Tg.

In an effort to have low melt viscosity at the time of consolidation, and thereby ease or improve processability, several approaches have been developed in the past, but all of these have serious drawbacks. This invention overcomes many of these deficiencies.

THE FIGURE

FIG. 1 shows schematically the arrangement of the lay-up for autoclave processing of a composite.

SUMMARY OF THE INVENTION

The present invention provides a method for producing high quality fiber reinforced polyimide matrix composites, having a void content of less than 1%, at moderate melt-consolidation pressures, by a process comprising the following steps:

a) Combining fiber with a molecular weight limiting polyimide precursor solution of i) at least one aromatic diamine and a molar excess of at least one aromatic dianhydride or functional equivalent thereof; ii) at least one aromatic diamine and at least one aromatic dianhydride or functional equivalent thereof in stoichiometric proportions and an aromatic monoanhydride or functional equivalent thereof; or iii) at least one aromatic dianhydride or functional equivalent thereof and a molar excess of at least one aromatic diamine and an aromatic monoanhydride or functional equivalent thereof in amount sufficient to end-cap the molar excess of diamine;

b) Polymerizing the precursors and devolatilizing the product by heating until the volatiles are substantially removed;

c) Heating the devolatilized product to a temperature above the glass transition temperature until the melt viscosity of the polymer is sufficiently low to permit melt-consolidating without substantial degradation at a pressure of under 650 pounds per square inch;

d) Melt-consolidating the product to reduce void content below 1%; and e) Heating the product until the glass transition temperature of the resulting product is equal to or greater than that of the polymer prepared from stoichiometric proportions of the same polyimide precursors.

DETAILED DESCRIPTION OF THE INVENTION

Figure 1:
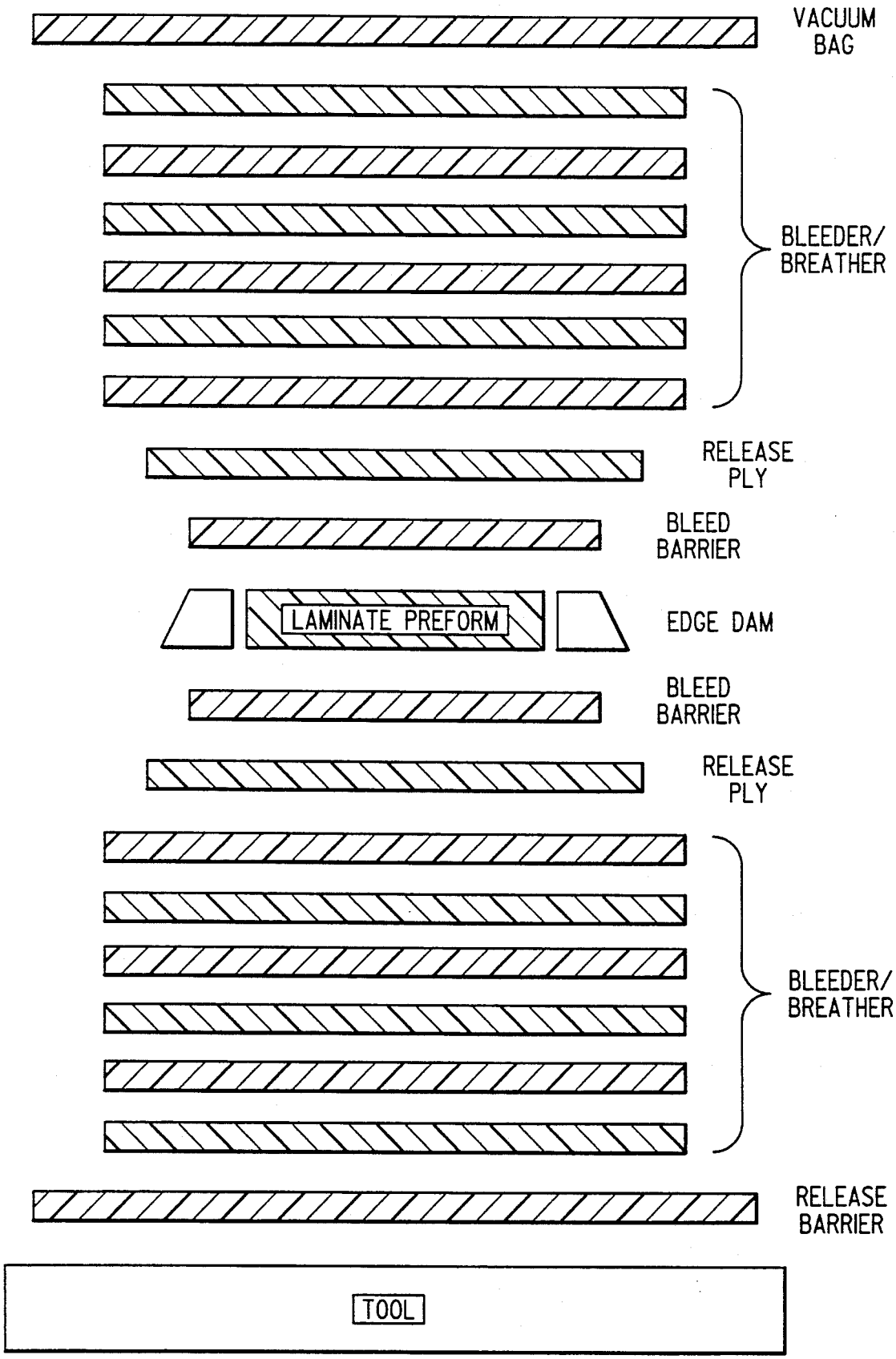

High quality composite articles utilizing the present invention can be produced from continuous unidirectional fiber prepreg, woven fabric prepreg, chopped fiber prepreg or some other fiber form. Common reinforcing fiber, such as those from carbon, glass or aramid materials, may be employed.

Any of the various aromatic dianhydrides or functional equivalents thereof may be employed as a reacting monomer. Typical functional equivalents of the dianhydrides are the tetraacids, the diester diacids, and the diester diacid chlorides. some examples are 2,2-bis(3', 4'-dicarboxyphenyl) hexafluoropropane or its functional equivalent, pyromellitic diester diacid or its functional equivalent, and 3,3', 4,4'-benzophenonetetracarboxylic acid dianhydride or its functional equivalent. among the various aromatic diamines that may be used are para- and meta-phenylenediamine, 4,4'-[(1,1'-biphenyl)-2,5-diylbis(oxy)]bisbenzeneamine, 2,2-bis[4,4'-aminophenoxy)phenyl]hexafluoropropane, 4,4'-methylenedianiline, and 2,2-bis(4-aminophenyl)hexafluoropane. Other aromatic primary diamines are disclosed in Br. Patent No. 1,396,331 and in U.S. Pat. Nos. 3,959,350 and 4,576,857. As solvents, N-methylpyrrolidinone (NMP), dimethylacetamide (DMAc) and mixtures of such amides with lower alcohols may be used. Preferably, essentially pure ingredients should be used.

There are, however, several factors which provide the key technology for the present invention which permit melt-consolidation at moderate pressure followed by final development of the necessary glass transition temperature (Tg) required for high performance and service at high temperature.

One must select a polyimide precursor solution that limits molecular weight build-up until the volatiles are substantially removed, i.e., are well below 1% as determined by thermogravimetric analysis or by equivalent means. Polymerization of aromatic diamines with aromatic dianhydrides or functional equivalents can be limited by use of a molar excess of the dianhydride monomer, preferably from about 5% to 20% excess above stoichiometric proportions. Another way of limiting molecular weight build-up is through use of stoichiometric amounts of diamine and dianhydride or its functional equivalent and a non-reactive aromatic monoanhydride end-capping agent, such as phthalic anhydride, or its functional equivalent. By "nonreactive" is meant an end-cap that does not react further in the course of processing as would be the case with 5-norbornene-2,3-dicarboxylicanhydride(nadic anhydride). The monoanhydride should be present to the extent of from about 5% to 20 mole % of the diamine. Still another way of limiting molecular weight build-up is through use of a molar excess of the aromatic diamine of about 5% to 20%, in conjunction with an aromatic monoanhydride as previously described, or its functional equivalent in sufficient amount to end-cap the molar excess of diamine.

It is important that the removal of polymerization byproduct volatiles and solvent is essentially completed prior to melt-consolidation. This is achieved through heating and with vacuum application, if necessary. It is important to substantially remove the volatiles. A level of less than 1% volatiles, and preferably less than 0.5% volatiles, should be reached if excessive voids and/or disruption of the fiber orientation in laminates through bubble formation are to be prevented. Both of these factors lead to a reduction in mechanical properties.

After the volatiles are removed, the temperature of the molecular weight limited polyimide is raised above the glass transition temperature until the melt viscosity of the polymer is sufficiently low to permit melt-consolidation without substantial degradation, at a pressure of under 650 pounds per square inch (psi). It is preferred to melt-consolidate and compact the product as soon as conveniently possible because continued heating causes further polymerization and concomitant processing difficulties, such as the need for higher processing temperatures and/or pressures.

An advantage of the novel process is that composites can be prepared using processing equipment presently available having limited pressure capabilities, and at temperatures below those causing undue polymer degradation in the course of the melt-consolidation operation. In order to achieve desirable composite structures, it is important that the melt-consolidation procedure reduce the void content below 1%. This can be determined by conventional means.

Subsequent to melt-consolidation, the composite must be heated for an extended period of time to increase the glass transition temperature, Tg. This curing step is preferably done under constraint so as to maintain the shape of the composite. Curing at temperatures above that used for melt-consolidation speeds the development of high Tg.

Precursor solutions useful for this invention are prepared by conventional techniques. A procedure for the preparation of a high solids precursor solution based on 2,2-bis(3', 4'-dicarboxyphenyl)hexafluoropropane and a mixture of para- and meta-phenylene diamine is typical. The appropriate amount of 2,2-bis(3', 4'-dicarboxyphenyl)hexafluoropropane is added to a solvent mixture, consisting of 55 parts ethanol and 45 parts N-methyl pyrrolidinone (NMP) in a suitably sized well-stirred vessel. The mixture is heated to dissolve the 6FTA. The temperature is reduced and an appropriate amount of the diamines is gradually added. Heating of the mixture is maintained to bring all of the ingredients into solution. Little reaction occurs between the monomers during this process. After preparation the solution is stored at 0° C. or below to minimize further reaction.

Prepreg is prepared through the impregnation of the desired fiber substrate with a suitable precursor solution using standard commercial process equipment. It is laid on a suitable release film and wound on a tube for convenient use and storage. Woven fabric prepreg can be dip coated from solution typically of about 50% by weight cured resin solids. Unidirectional tape prepreg can be impregnated from higher solids precursor solution.

A method of forming a composite laminate begins with the cutting of prepreg into pieces of the desired size and shape. Preforms for autoclave processing are built up by stacking individual plies which have been carefully aligned with the desired orientations. With thick constructions, debulking is carried out after each additional 4 to 6 plies have been laid down using standard vacuum debulking techniques.

In autoclave processing the preform is laid up in a vacuum bag setup for "wet" prepreg using commercial high temperature bagging and sealant materials.

1. In the first stage, a gradual heatup and vacuum application are used to polymerize and devolatilize the resin. The heatup rate should be such that gross disruption of the preform does not occur from a too rapid curing/devolatilization. From 0.2° to 5° C. per minute are useful. Rates of 1° C./min or less have been successfully employed for laminates up to 96 plies. A low level of vacuum, 2" to 4" Hg, is applied at the start of the process to minimize bleedout of the precursor solution, which results in a loss of resin and possible composition variability. This low level is maintained prior to the beginning of polymerization and rapid viscosity buildup which typically begins at about 120° C. Low vacuum aids in maintaining a porous structure which facilitates the removal of volatiles. Full vacuum is applied in stages at temperatures above 120° C.

2. When devolatilization is essentially complete, i.e., volatiles less than 1%, the temperature is raised to a temperature at which the melt viscosity is sufficiently low to permit compaction at pressures available, generally below 650 psi (about 100° C. above the Tg for the resin produced in stage 1). The autoclave is pressurized gradually over about 15 minutes to begin consolidation. This reduces void content via the processes of compaction and resin flow. With the application of sufficient pressure, voids can be essentially eliminated. It is undesirable to achieve consolidation by a slow process because the resin undergoes curing at the compaction temperatures and eventually becomes too viscous to process. For like reasons, the process temperature should not be allowed to rise unchecked prior to the consolidation stage.

3. After consolidation, the laminate is held under pressure (constrained to avoid deconsolidation) at high temperature until the desired level of Tg has developed. This temperature can be the consolidation temperature, or, if desired, Tg development can be accelerated by increasing temperature.

EXAMPLE 1

This example illustrates practice of the invention using a stoichiometric excess of aromatic tetraacid.

Polyimide precursor solution based on 2,2-bis-(3', 4'-dicarboxyphenyl)hexafluoropropane (6FTA) and metaphenylene diamine (MPD) and para-phenylene diamine (PPD) was prepared according to the following procedure: The necessary amount of N-methylpyrrolidinone (NMP) and ethanol solvents, in the ratio 45 parts to 55 parts, were added to the reaction vessel which had been purged with dry nitrogen. Agitation was begun and maintained throughout the remainder of the procedure. 6FTA was added gradually and the mixture heated to between 60° C. and 70° C. Upon completion of 6FTA addition the temperature of the mixture was raised to between 92° C. and reflux and held for 3.5h to dissolve the 6FTA. The solution was then cooled to between 60° C. and 65° C. and the diamines, in the isomer ratio 5 parts meta to 95 parts para, were added gradually. The mixture was held for 1.5h at 60° C. to 65° C. to dissolve the diamines. The solution was then transferred to one gallon containers and placed in storage at 0° C. Prior to use these solutions are warmed. The ingredients used to prepare a precursor solution having a monomer compositional imbalance of 10% molar excess 6FTA were as follows:

| NMP | 7668.9 g | |
|---|---|---|
| Ethanol | 9373.2 g | |
| 6FTA (96.97% pure) | 71861.1 g | 145.09 mol |
| MPD | 712.66 g | 6.59 mol |
| PPD | 13540.7 g | 125.2 mol |

This resulting precursor solution having a nominal 63.5% cured resin solids content was used to prepare 12" wide prepreg tape, with carbon fiber (Hercules AS-4/12K). The resulting prepreg contained about 37.7% by weight resin on a fully cured basis. The prepreg was stored in moisture resistant packages at 0° C.

A composite laminate was prepared from prepreg as follows: Remove the prepreg from cold storage and allow to come to room temperature. Cut into 12" lengths and lay into a 12"×12"×24 ply unidirectional configuration preform using a vacuum debulking step of 10 to 20 minutes at a nominal 28" Hg after every 6 additional plies are laid down. This preform was laid-up for vacuum bag autoclave processing by a conventional arrangement shown in FIG. 1. The materials used were 3 mil polyimide film ("Kapton") vacuum bag, glass breathers/bleeders, release ply, bleed barrier and steel edge dams. An assemblage of three preforms was prepared on a flat stainless steel tool having 6 built-in vacuum ports (not shown) and processed in a 3'×5' autoclave (not shown) At the start, the autoclave is at ambient temperature with vacuum in the bag set at 2"Hg and atmospheric pressure outside. Thermocouples are positioned in contact with the preforms. The autoclave is heated at the rate of 0 5° C./min from ambient to 400° C. and held for 1h. At 385° C., the autoclave is pressurized to 400 psi over a 15 minute period to consolidate the composite. Curing to increase Tg is then achieved by heating at 1° C./min to 430° C., holding for 4h, cooling to 300° C. at about 1.7° C./min and then cooling to ambient at 5° C./min. Vacuum is raised from 2"Hg to 4"Hg at 160° C. and to 8"Hg, at 180° C. At 200° C. the vacuum is raised to 16"Hg and at 210° C. the vacuum is raised to full (nominal 30"Hg).

The actual density of the laminate produced in this manner was determined by the method of Archimedes. The void content was determined using the actual density and a density estimate for a void free laminate (theoretical density) based on a mass balance which utilized 1.45 g/cm³ and 1.80 g/cm³ for the resin and carbon fiber densities respectively with the equation % Voids = 100[1 — (Actual Density/Void Free Density)]

The laminate was then cut into the desired number and size of specimens for various test evaluations.

The laminate glass transition temperature, Tg, was determined with a dynamic mechanical analyzer (Du Pont 9900 TA system using a model 983 DMA module) operated in a resonance mode employing a 3"×0.5"×0.13" specimen and a heatup rate of 10° C./min to 430° C. The Tg was taken by a standard method as the intercept of the lines drawn tangent to the pre-Tg and post-Tg modulus temperature curve.

Flexural (flex) strength was determined according to ASTM D-790. Specimens were 1.0"×3"×0.13" thick and run at a span to depth ratio of 16:1. The strength reported is an average of five values.

Thermal oxidative stability was evaluated using 1.0"×3"×0.13" laminate specimens aged in an air circulating air oven at 370° C. The oven used for this was a Blue M Ultra Temp model having a chamber size of 2.08'×1.67'×1.67' with a controlled inlet damper set to allow ambient air entry of 70.6 cfm. Upon completion of aging for 216h, the specimens were removed and evaluated. Two measures of thermal stability were made, the change of weight (loss) averaged for two specimens and the retention of flex strength determined as previously detailed.

Results of the laminate evaluations are reported in TABLE 1.

EXAMPLE 2

(Control)

This example is a control using a stoichiometric imbalance as in EXAMPLE 1.

A laminate was prepared from the prepreg of EXAMPLE 1 and in the same manner except for the elimination of the step of heating the polymer to raise the Tg in the autoclave processing cycle. In this example, cooldown of the autoclave followed immediately after the autoclave was held at 400° C. for 1 hr. The void content and Tg of this laminate yielded the results reported in TABLE 1.

EXAMPLE 3

This example shows use of a greater stoichiometric imbalance than in EXAMPLE 1.

A precursor solution having a monomer compositional imbalance of 15% stoichiometric molar excess of 6FTA, using the same MPD/PPD ratio as in EXAMPLE 1, was prepared at about 63.5% cured resin solids according to the procedures of EXAMPLE 1, using the following ingredients:

| NMP | 7858.1 g | |
|---|---|---|
| Ethanol | 9604.3 g | |
| 6FTA (97.16% pure) | 37,612.8 g | 75.97 mol |
| MPD | 357.5 g | 3.30 mol |
| PPD | 6788.8 g | 62.77 mol |

A carbon fiber prepreg having 37.0% cured resin solids was prepared and a laminate produced in an autoclave at 400 psi by the procedures of EXAMPLE 1. Tested in the same manner of EXAMPLE 1, this laminate yielded the results reported in TABLE 1.

EXAMPLE 4

(Control)

A precursor solution based on a stoichiometric balance of monomers was prepared from 6FTA tetraacid, using the same MPD/PPD diamine ratio as in Example 1, was prepared at about 63.5% cured resin solids according to the procedures of Example 1 using the following ingredients:

| NMP | 7654.0 g | |
|---|---|---|
| Ethanol | 9355.0 g | |
| 6FTA (97.74% purity) | 37331.0 g | 75.97 mol |
| MPD | 410.9 g | 3.79 mol |
| PPD | 7807.7 g | 72.19 mol |

A carbon fiber prepreg having 36.2% cured resin solids was prepared and a laminate produced in an autoclave at 650 psi by the procedures of EXAMPLE 1, except that no cure was carried out after consolidation, i.e., the cooldown step of the autoclave process immediately followed the 1h hold at 400° C. Tested in the manner of EXAMPLE 1, this laminate yielded the properties reported in TABLE 1. Use of a post cure would raise the Tg but would not lower the void content which was excessive.

TABLE 1

| EX. NUMBER | COMP. IMBALANCE % | CURED* 4 h/430° C. | VOIDS Vol. % | Tg °C. | FLEX STR. ksi | TOS WT. LOSS % | TOS FLEX STR RETENTION % |
|---|---|---|---|---|---|---|---|
| 1 | 10.0 | Yes | 0.6 | 370 | 200 | 2.3 | 77 |
| 2 | 10.0 | No | 0.4 | 330 | — | — | — |
| 3 | 15.0 | Yes | 0.0 | 360 | 190 | 2.3 | 78 |
| 4 | 0.0 | No | 1.8 | 350 | — | 2.9 | — |

*Heating the consolidated polyimide product to increase Tg.

EXAMPLE 5

Prepreg, 12" wide, was made from IM6 (Hercules) carbon fiber (IM6, Hercules) and a polyimide precursor solution. The precursor solution was prepared from pyromellitic diethylester diacid and a 5 mol % excess of 4,4'-[[1,1'-biphenyl]-2,5-diylbis(oxy)]bisbenzeneamine in N-methylpyrrolidinone solvent. The excess amine was endcapped with phthalic anhydride. The solution was prepared at about 64 wt. % cured resin solids and the prepreg contained about 40 volume % polyimide resin on a fully cured basis. The prepreg was cut into lengths and layed-up into 3 panels with the following dimensions and ply orientations: 8"×11" (0°)$_{32}$, 14"×14" (+45°,90°,−45°,0°)$_{3S}$ and 14"×14" (+45°,−45°)$_{8S}$. The (0°) laminate had along one side two 1" wide strips of 3-mil film ("Kapton") inserted between plies 16 and 17 as a crack starter. The panels were placed on a release barrier coated flat graphite tool and covered with one layer of release ply and four plies of S-glass fiberglass bleeder/breather fabric. A layer of 3-mil film ("Kapton") was sealed around the graphite with sealant tape to provide a vacuum bag. This assemblage was placed in an autoclave and subjected to the following cure cycle:

A 5" Hg vacuum was applied and the autoclave heated from RT to 360° C. at 0.5° C./min. A 28" Hg vacuum was applied at 204° C. and the composite consolidated by applying a pressure of 185 psi at 10 psi/min at 360° C. The autoclave was held for 1 hour at 360° C. To effect cure, the autoclave was heated to 393° C. at 0.5° C./min and held for 1 hour at 393° C. The product was cooled from 393° C. to 248° C. at 0.5° C./min and from 248° C. to ambient temperature at 2.5° C./min. Pressure was removed at 93° C.

After debagging and trimming, the panels were cut into test specimens. Prior to cutting, the density of the quasi-isotropic and ±45° panels were measured by the method of Archimedes and found to be 1.56 g/cc versus a theoretical density of 1.56 g/cc. Laminate Tg was measured by DMA similarly to the procedure of EXAMPLE 1. TABLE 2 summarizes the results of the thermal analysis. Also included in the table is a typical value for laminate prepared by initiating the autoclave cooling sequence immediately following the one hour hold at 360° C., that is, the composite was not cured after melt-consolidation.

TABLE 2

| | VOID CONTENT | Tg (DMA) |
|---|---|---|
| Post cured | <0.5% | 269° C. |
| Non-postcured | <0.5% | 260° C. |

The composites of this invention may be prepared in a variety of forms, such as rings, cylinders and angular sections and used for turbine engine cases, shrouds, struts and other useful articles.

We claim:

1. A process for preparing high quality fiber reinforced polyimide matrix composites having a void content of less than 1%, at moderate melt-consolidation pressures comprising a) forming a prepreg by combining fiber with a molecular weight limiting polyimide precursor solution of i) at least one aromatic diamine and a molar excess of at least one aromatic dianhydride or functional equivalent thereof; ii) at least one aromatic diamine and at least one aromatic dianhydride or functional equivalent thereof in stoichiometric proportions and an aromatic monoanhydride or functional equivalent thereof; or iii) at least one aromatic dianhydride or functional equivalent thereof and a molar excess of at least one aromatic diamine and an aromatic monoanhydride or functional equivalent thereof in amount sufficient to end-cap the molar excess of diamine;

b) polymerizing the precursors and devolatilizing the product by heating until the volatiles are substantially removed;

c) heating the devolatilized product to a temperature above the glass transition temperature until the melt viscosity of the polymer is sufficiently low to permit melt-consolidating without substantial degradation at a pressure of under 650 pounds per square inch;

d) melt-consolidating the product to reduce void content below 1%; and e) heating the product until the glass transition temperature of the resulting product is equal to or greater than that of the polymer prepared from stoichiometric proportions of the same polyimide precursors.

2. The process according to claim 1 wherein the polyimide precursor is selected from i) and consists essentially of a mixture of meta- and para-phenylene diamines and a molar excess of 2,2-bis(3', 4'-dicarboxyphenyl)hexafluoropropane.

3. The process according to claim 1 wherein the polyimide precursor is selected from iii) and consists essentially of pyromellitic diethylester diacid and a molar excess of 4,4'-[(1, 1'-biphenyl)-2,5-diylbis(oxy)]-bisbenzeneamine, the excess amine being end-capped with phthalic anhydride.

4. The process according to claim 1 wherein a plurality of prepregs formed in step a) are stacked before proceeding with step b).

* * * * *